(12) United States Patent  
Liu et al.

(10) Patent No.: US 8,316,058 B2  
(45) Date of Patent: Nov. 20, 2012

(54) DATA STRUCTURE VERSIONING FOR DATA MANAGEMENT SYSTEMS AND METHODS

(75) Inventors: Tse-Hsin Jason Liu, Wellesley, MA (US); Wei Miao, Lexington, MA (US)

(73) Assignee: Verizon Business Network Services Inc., Basking Ridge, NJ (US)

( * ) Notice: Subject to any disclaimer, the term of this patent is extended or adjusted under 35 U.S.C. 154(b) by 0 days.

(21) Appl. No.: 13/099,296

(22) Filed: May 2, 2011

(65) Prior Publication Data

US 2011/0208781 A1    Aug. 25, 2011

Related U.S. Application Data

(63) Continuation of application No. 11/935,066, filed on Nov. 5, 2007, now Pat. No. 7,941,449.

(51) Int. Cl.  
*G06F 17/30* (2006.01)

(52) U.S. Cl. .......................................... 707/793; 706/55

(58) Field of Classification Search .................. 707/793; 706/55  
See application file for complete search history.

(56) References Cited

U.S. PATENT DOCUMENTS

| | | | |
|---|---|---|---|
| 5,754,858 A | 5/1998 | Broman et al. | |
| 5,835,601 A * | 11/1998 | Shimbo et al. | 713/165 |
| 5,878,408 A * | 3/1999 | Van Huben et al. | 1/1 |
| 6,266,674 B1 | 7/2001 | Hejna | |
| 6,529,905 B1 * | 3/2003 | Bray et al. | 1/1 |
| 7,181,445 B2 | 2/2007 | Bebo et al. | |
| 7,571,166 B1 | 8/2009 | Davies et al. | |
| 2005/0203943 A1 | 9/2005 | Su et al. | |
| 2006/0143148 A1 | 6/2006 | Degtyar et al. | |
| 2006/0230041 A1 * | 10/2006 | Sherwood | 707/8 |
| 2006/0242187 A1 | 10/2006 | Scharf | |
| 2007/0073771 A1 * | 3/2007 | Baikov et al. | 707/104.1 |
| 2007/0185898 A1 | 8/2007 | Hekmatpour et al. | |
| 2007/0196958 A1 | 8/2007 | Bhattacharya et al. | |
| 2007/0203931 A1 | 8/2007 | Ukelson et al. | |
| 2007/0250408 A1 * | 10/2007 | Leon et al. | 705/28 |
| 2008/0114795 A1 * | 5/2008 | Agrawal et al. | 707/101 |
| 2008/0155500 A1 | 6/2008 | Richmond | |
| 2008/0168109 A1 | 7/2008 | Gaurav et al. | |
| 2009/0083297 A1 | 3/2009 | Pohl et al. | |
| 2009/0112875 A1 | 4/2009 | Maes | |

* cited by examiner

*Primary Examiner* — Robert Beausoliel Jr  
*Assistant Examiner* — Noosha Arjomandi

(57) ABSTRACT

In one of many possible implementations, an exemplary method comprises maintaining a baseline data structure comprising a plurality of baseline data records and a base set of relationships between the baseline data records, providing, for access by an external party, a customizable data structure comprising copies of the baseline data records and a customizable set of relationships between the copies of the baseline data records, fixing the base set of relationships in the baseline data structure to be unchangeable by the external party, and defining the customizable set of relationships in the customizable data structure to be changeable by the external party. Corresponding systems and methods are also disclosed.

21 Claims, 11 Drawing Sheets

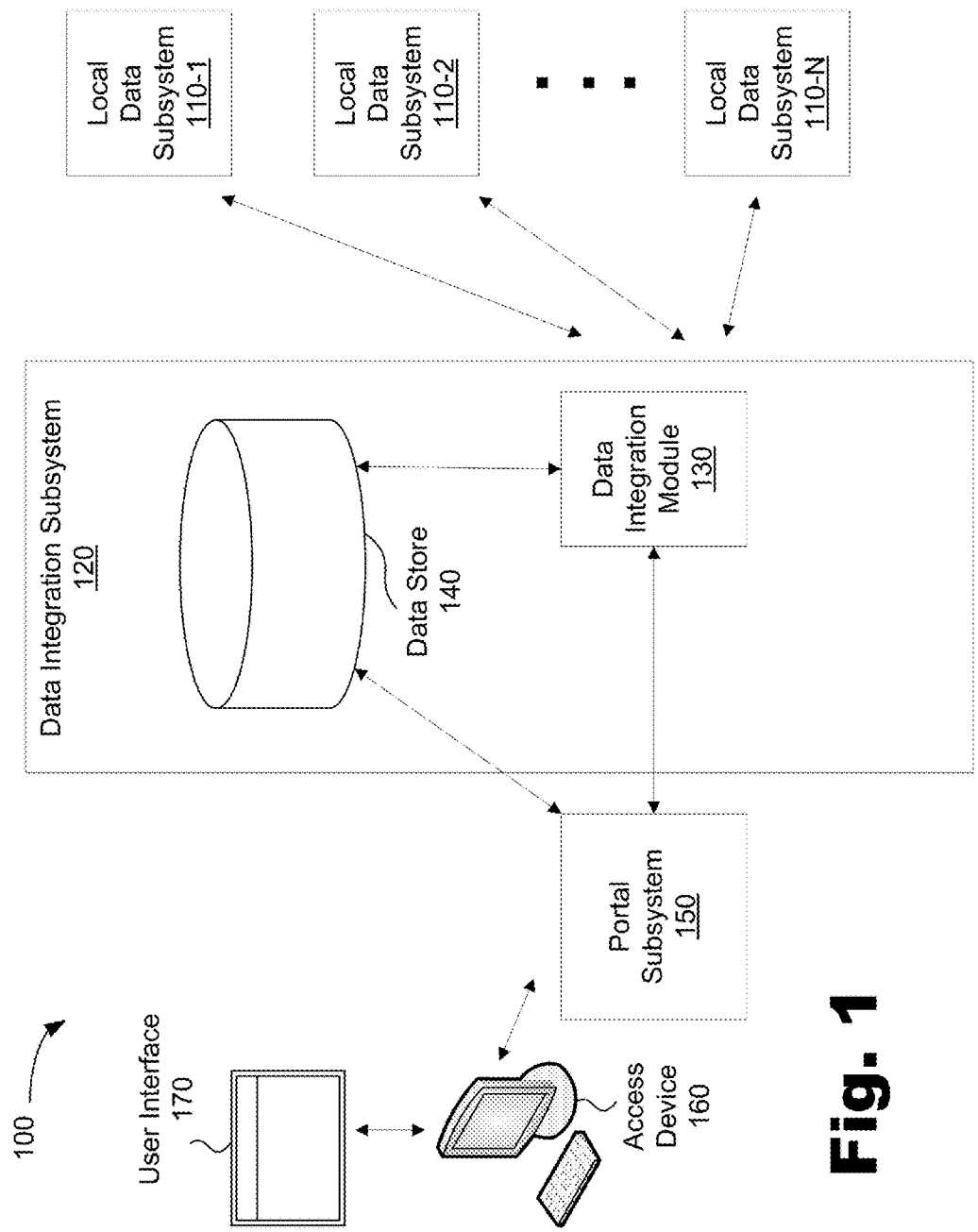

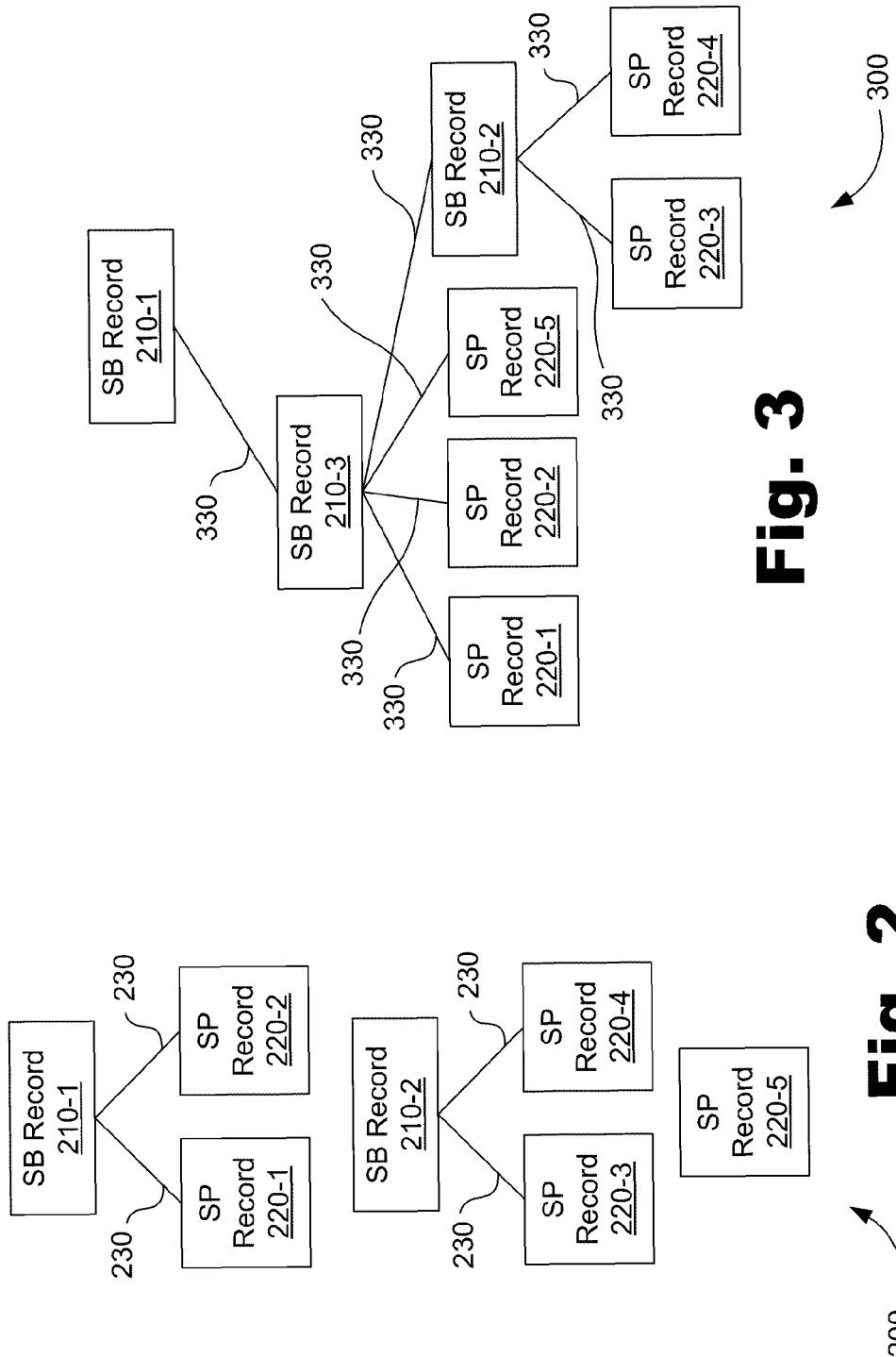

DATA STRUCTURE VERSIONING FOR DATA MANAGEMENT SYSTEMS AND METHODS

RELATED APPLICATIONS

This application is a continuation application of U.S. patent application Ser. No. 11/935,066, filed on Nov. 5, 2007, and entitled DATA STRUCTURE VERSIONING FOR DATA MANAGEMENT SYSTEMS AND METHODS, the content of which is incorporated herein by reference.

BACKGROUND INFORMATION

A typical enterprise computing environment includes multiple heterogeneous and distributed database systems supporting a variety of different enterprise organizations and business purposes. For example, many enterprises, such as businesses and the like, maintain different database systems to support customer billing, sales, accounting, marketing, inventory, ordering, repairs, procurement, etc. Further, many enterprises are the result of a merger of two or more predecessor organizations, each with their own set of heterogeneous and distributed database systems.

There are many reasons why multiple heterogeneous and distributed database systems may exist within an enterprise. Where database systems were created using different technologies or different data models, there may be considerable disruption to the enterprise, not to mention considerable time and expense, in migrating multiple database systems to a common technology platform. Accordingly, in many cases it is simply impossible, or at least impractical, for an enterprise to integrate its multiple heterogeneous and distributed database systems. Further, the risk of committing the entire enterprise to a single technology platform is unacceptable to many enterprises, given the possibilities that, for a given technology platform, vendors may go out of business, properly experienced staff may be unavailable, or the technology may not prove to be robust or adequate for the needs of the enterprise. Moreover, from the standpoint of resisting and recovering from disasters, it is advantageous for an enterprise to have multiple database systems that are widely dispersed geographically and/or in terms of technology platforms, business units, etc.

However, the diversity of an enterprise's database systems places technical limitations on the ability of the enterprise to provide meaningful information and functionality to its customers while also maintaining the integrity of data. For example, a particular customer of the enterprise may desire to organize and view its account information maintained by the enterprise in a particular way that is not supported by the enterprise's diverse database systems. The problem is exacerbated for a complex customer that has many entities and accounts and wishes to organize and view its account and entity information in a variety of different ways as may serve its various business purposes. By way of an example, an enterprise customer may wish to have access to multiple concurrent, independent, and customizable versions of account information to support different business organizations, personnel, purposes, and operations.

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical reference numbers designate identical or similar elements.

FIG. 1 is a block diagram illustrating an exemplary data management system.

FIG. 2 illustrates an exemplary baseline data structure representing a base set of relationships between subscriber and subscription data records.

FIG. 3 illustrates an exemplary first customizable data structure associated with the baseline data structure of FIG. 2.

DETAILED DESCRIPTION OF PREFERRED EMBODIMENTS

Figure 4:
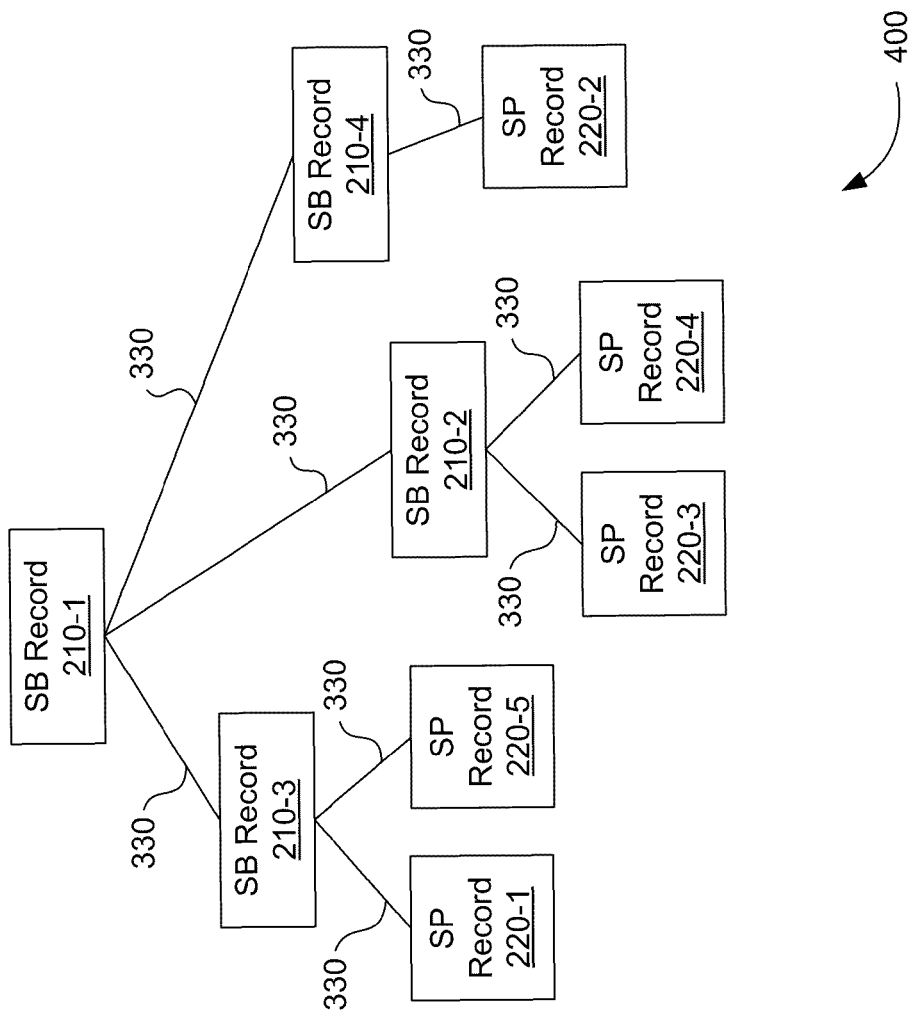
FIG. 4 illustrates the exemplary first customizable data structure of FIG. 3 as modified to represent a first custom set of data relationships.

Exemplary data structure versioning for data management systems and methods is disclosed. Exemplary systems and methods may be configured to provide multiple concurrent versions of independently customizable data structures representing different sets of data relationships. Accordingly, one or more users with appropriate access permissions may create multiple concurrent and independent versions of custom data structures representing different sets of data relationships, as may suit the users purposes. As described further below, data integrity may be maintained while providing the independently customizable data structures.

An exemplary system may include a data integration subsystem configured to maintain a baseline data structure representing a base set of data relationships and a mapping of the baseline data structure to local data maintained by a plurality of local data subsystems. The system may further include a portal subsystem configured to provide a first customizable data structure associated with the baseline data structure for user access, create a copy of at least a subset of the baseline data structure, and provide a second customizable data structure associated with the copy of the baseline data structure for user access. The first and second customizable data structures are independently customizable. That is, the first and second customizable data structures can be customized to concurrently represent different custom sets of data relationships.

The portal subsystem may maintain permissions settings and provide an external party (e.g., a customer of an enterprise maintaining data, or one or more users associated with the customer) with external user access to the baseline data structures and/or the customizable data structures based on the permissions settings. The portal subsystem may also provide one or more tools configured to enable an external party to provide external user input for creating and customizing the customizable data structures.

As used herein, "internal party" may refer to any person or organization (e.g., a service provider) maintaining data, and "external party" or "external user" may refer to any person or organization that is external to (i.e., not part of) the internal party. An external party may include a customer of the internal party, including a subscriber to services provided by the internal party. The internal party may maintain data associated with the external party and/or related to the providing of one or more services (e.g., telecommunications services) to the external party.

In certain implementations, the portal subsystem may be configured to synchronize customizable data structures with associated baseline data structures, including detecting at least one difference between a baseline data structure and an associated customizable data structure and updating the customizable data structure based on the detected difference. Accordingly, updates to a baseline data structure can be propagated to the associated customizable data structure to help maintain data integrity and/or enforce user permissions settings. As described below, updating of the customizable data structure may include synchronizing the customizable data structure with the associated baseline data structure and/or inserting notification of the detected difference in the customizable data structure.

Components and functions of exemplary data management systems and methods will now be described with reference to the drawings.

FIG. 1 illustrates an exemplary data management system 100 (or simply "system 100"). As shown in FIG. 1, system 100 may include local data subsystems 110-1 through 110-N (collectively "local data subsystems 110") communicatively coupled to a data integration subsystem 120 having a data integration module 130 and a data store 140. System 100 further includes a portal subsystem 150 communicatively coupled to data integration subsystem 120 and configured to selectively communicate with an access device 160 that is configured to present a user interface 170 for consideration of a user of the access device 160.

Elements of system 100 may communicate with one another using any suitable communication technologies, devices, media, and protocols supportive of data communications, including, but not limited to, the Internet, intranets, local area networks, other communications networks, data transmission media, communications devices, Transmission Control Protocol ("TCP"), Internet Protocol ("IP"), File Transfer Protocol ("FTP"), Telnet, Hypertext Transfer Protocol ("HTTP"), socket connections, Ethernet, data bus technologies, and other suitable communications technologies. In certain implementations, at least a subset of communications between local data subsystems 110 and data integration subsystem 120 may be carried out as described in co-pending U.S. patent application Ser. No. 11/443,364, entitled "Asynchronous Data Integrity For Enterprise Computing," filed May 31, 2006 and incorporated herein by reference in its entirety.

In certain implementations, one or more elements of system 100 may be implemented in one or more computing devices. System 100 may include any computer hardware and/or instructions (e.g., software programs), or combinations of software and hardware, configured to perform the processes described herein. In particular, it should be understood that elements of system 100 may be implemented on one or more physical computing devices. Accordingly, system 100 may include any one of a number of computing devices (e.g., one or more servers), and may employ any of a number of computer operating systems, including, but by no means limited to, known versions and/or varieties of the Microsoft Windows® operating system, the Unix operating system, and the OS/390 operating system. System 100 may also employ any of a number of database management tools, including, but not limited to, known versions and/or varieties of Microsoft SQL Server sold by Microsoft Corporation of Redmond, Wash. and DB2 sold by International Business Machines Corporation of Armonk, N.Y.

Accordingly, one or more of the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) may include any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media may include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary system 100 is shown in FIG. 1, the exemplary components illustrated in the Figure are not intended to be limiting. Other alternative hardware environments and implementations may be used in other implementations. Exemplary components of system 100 will now be described in additional detail.

Local data subsystems 110 may include computing devices and data management applications configured to store and maintain electronic data that may be referred to as "local data." Each of the local data subsystems 110 may include one or more databases and/or other suitable data storage technologies, including known data storage technologies.

Local data may represent data records and relationships between data records, which may be referred to as local data records and relationships. In certain examples, local data subsystems 110 may be operated by an internal party, and the local data maintained by the internal party may be associated with one or more external parties such as customers of the internal party. Hence, local data may include data records representative of customer entities and customer accounts, as well as data representing one or more relationships between the customer entities and accounts.

As an example, an internal party (e.g., telecommunications enterprise) may maintain local customer-related data in local data subsystems 110. Each of the local data subsystems 110 may be associated with different organizations and/or business purposes of the enterprise, including customer billing, sales, accounting, marketing, inventory, ordering, repairs, procurement, or other organization or purpose of the enterprise. Local data subsystems 110 may also be associated with and/or distributed across different geographic areas.

While the exemplary implementations described herein refer to customer-related data, which may also be referred to herein as subscriber-related data, this example is not limiting. Local data may represent other information in other implementations.

Typically, local data subsystems 110 are heterogeneous. For example, one or more of the local data subsystems 110 may store local data according to local data schemas (e.g., according to different technologies, formats, data models, or business rules) that are different from the local data schemas used by the other local data subsystems 110. For instance, data subsystem 110-1 may employ a first data schema, data subsystem 110-2 may employ a second data schema, and data subsystem 110-N may employ another data schema.

Data integration subsystem 120 may include any device or combination of devices and communication technologies useful for communicating with portal subsystem 150 and local data subsystems 110. Data integration subsystem 120 may also include any device or combination of devices and data storage and processing technologies useful for storing and processing data, including "global data" that is mapped from local data stored at the local data subsystems 110.

Global data may be mapped from the local data and stored at data integration subsystem 120 in any manner suitable for maintaining data integrity between the global and local data, including preserving behaviors, relationships, and properties of the local data. Mappings between local data and global data may be defined based on local data models, properties of the local data, and/or as may serve a particular implementation. Mappings between local data and global data may also be based on a predefined global data model. Accordingly, a mapping can represent any definition of a relationship between local data and global data that can suitably preserve the properties of the local data (or at least certain select properties of the local data) in the global data and is in accordance with a global data model.

Mappings may be defined in any acceptable manner, including one or more persons (e.g., system administrators or operators) associated with the internal party manually defining mappings based on the properties and specifications of local data stored in local data subsystems 110 and on a global data model. The defined mappings may be used in subsequent processing for automatically translating between and/or synchronizing the local data and the global data.

In certain implementations, global data may be mapped to local data in any of the ways described in co-pending U.S. patent application Ser. No. 11/443,363, entitled "Systems and Methods for Managing Integrated and Customizable Data," filed May 31, 2006, and incorporated herein by reference in its entirety. Mappings may be defined based on the exemplary global data model described in the same U.S. patent application Ser. No. 11/443,363.

Data integration subsystem 120 may be configured to maintain global data such that over time it accurately represents local data stored in local data subsystems 110. For example, updates to local data may be carried through to global data in accordance with one or more predefined mappings between the global and local data. The updates may synchronize global data with local data.

Data integration module 130 may be configured to automatically translate data between a global data model implemented in data integration subsystem 120 and one or more of the local data models used by the local data subsystems 110. In particular, data integration module 130 may include one or more agents (e.g., software applications) that are configured to coordinate with local agents associated with the local data subsystems 110 to translate data between the global data model and the local data models. Translation functions may be performed in accordance with one or more of the above-described mappings between local and global data. In certain implementations, data translation functions, including, but not limited to, messaging, prioritization, update, synchronization, and integrity checking functions, may be carried out in any of the ways and using any of the technologies described in the previously mentioned an incorporated co-pending U.S. patent application Ser. No. 11/443,364 filed on May 31, 2006. Accordingly, global data stored at data integration subsystem 120 can be updated to reflect changes to the local data and thus accurately represent over time the local data stored at the local data subsystems 110.

Global data may be stored in data store 140, which may include one or more data storage mediums, devices, or configurations and may employ any type, form, and combination of storage media, including, but not limited to, hard disk drives, read-only memory, caches, databases, optical media, and random access memory. Data store 140 may include any suitable technologies useful for storing, updating, modifying, accessing, retrieving, deleting, copying, and otherwise managing data.

Global data may include data records representing any suitable information, including information associated with one or more external parties, such as information about customer entities and accounts. Data records representative of customer entities and accounts may be referred to as "subscriber records" and "subscription records," respectively. Such data records may include any information related to customer entities and accounts, including customer and/or account identifiers. The data records may also include type identifiers indicative of various types of data records. For example, a type identifier may indicate whether a data record is a subscriber or subscription record.

Global data may also include map records representative of links between data records. Accordingly, map records may be used to define one or more data relationships between data records such as subscriber and subscription records. Map records may include map record identifiers, as well as identifiers for data records being linked by the map records. Map records may also include relationship type identifiers indicative of relationship types between data records. For example, map record type identifiers may indicate whether map records are associated with a fixed or customizable data relationship (i.e., unchangeable or changeable by an external party), or the types of data records that are linked by the map records (e.g., subscriber-to-subscriber, subscriber-to-subscription, or subscription-to-subscription map records). Global data and map records may be assigned unique identifiers that enable the global data records to be used across system 100.

Global data and map records may be grouped to represent sets of data relationships. For example, data records may be linked by one or more map records to form a "data structure" representing a set of data relationships. Typically, such a data structure may define a hierarchical data tree having data records as nodes and map records linking the data records together to define a set of relationships between the data records. Any suitable data entity may be used to define a data structure, including one or more relational or hierarchical data tables, for example.

While global and local data may be used for the operations of an internal party operating the data integration subsystem 120 and local data subsystems 110, access to at least a subset of the global data may be selectively provided for external user access (i.e., for access by one or more users associated with an external party). This may allow an external party to manage and utilize data maintained by the internal party.

Portal subsystem 150 may be configured to provide external access to global data stored at data store 140. Portal subsystem 150 may include or be implemented on one or more computing devices. In certain implementations, portal subsystem 150 includes one or more servers (e.g., web servers) configured to selectively communicate with access device 160. Portal subsystem 150 and access device 160 may communicate over a communication network, which may include any network suitable for carrying communications between access device 160 and portal subsystem 150, including, but not limited to, the Internet or an intranet. In certain implementations, portal subsystem 150 provides an access portal by which external users can access and manage global data stored in data store 140.

An external user may utilize access device 160 to communicate with portal subsystem 150 and access and manage global data. Access device 160 may include any device physically or remotely accessible to one or more users and that allows a user to provide input to and receive output from portal subsystem 150. For example, access device 160 may include, but is not limited to, one or more desktop computers, laptop computers, tablet computers, personal computers, personal data assistants, cellular telephones, satellite pagers, wireless internet devices, embedded computers, video phones, mainframe computers, mini-computers, programmable logic devices, vehicular computers, Internet-enabled devices, and any other devices capable of communicating with portal subsystem 150. Access device 160 can also include or interact with various peripherals such as a terminal, keyboard, mouse, screen, printer, stylus, input device, output device, or any other apparatus that can help a user interact with access device 160.

Access device 160 may provide external access to portal subsystem 150 and consequently to data integration subsystem 120 via the portal subsystem 150. Accordingly, one or more users associated with an external party may utilize access device 160 to provide requests to and receive output from portal subsystem 150. In particular, users may use access device 160 to provide externally-defined data management commands to the portal subsystem 150. As described below, the commands may define custom data structures representing custom data relationships such as custom groupings of customer accounts, for example.

Access device 160 may include instructions for generating and operating user interface 170. The instructions may be in any computer-readable format, including software, firmware, microcode, and the like. When executed by a processor (not shown) of access device 160, the instructions may present user interface 170 to a user of access device 160. User interface 170 may be configured to present representations of global data and one or more data management tools configured to enable a user to externally manage the global data, including creating and managing custom data structures.

User interface 170 may comprise one or more graphical user interfaces ("GUIs") configured to display information and receive input from users. In certain exemplary implementations, user interface 170 includes a web browser, such as Internet Explorer® offered by Microsoft Corporation of Redmond, Wash., Mozilla Firefox, Safari, and the like. However, user interface 170 is not limited to web-based and/or graphical implementations and may include many different types of user interfaces that enable users to utilize access device 160 to communicate with portal subsystem 150. In some implementations, for example, user interface 170 may include a voice interface capable of receiving voice input from and providing voice output to a user.

A single access device 160 is shown in FIG. 1 for illustrative purposes only. It will be recognized that one or more access devices 160 may communicate with portal subsystem 150 and gain external access to global data.

Access to global data may be based on permissions settings maintained by portal subsystem 150. Permissions settings may be stored in data store 140 and accessed and used by portal subsystem 150 to determine whether users have permissions to access certain global data, or to determine the specific global data to be provided to a user. This allows portal subsystem 150 to selectively provide users or groups of users with access to different sets of global data in accordance with the permissions settings. Portal subsystem 150 may be configured to maintain and use permissions settings in any of the ways described in co-pending U.S. patent application Ser. No. 11/584,098, entitled "Integrated Data Access" and filed Oct. 20, 2006, co-pending U.S. patent application Ser. No. 11/584,111, entitled "Integrated Application Access" and filed Oct. 20, 2006, and/or the previously mentioned co-pending U.S. patent application Ser. No. 11/443,363 filed on May 31, 2006, each of which is herein incorporated by reference in its entirety.

A set of global data to which a user is allowed access based on permissions settings may be referred to as a "baseline data structure" or "entitlement data view." FIG. 2 illustrates an exemplary baseline data structure 200. Based on permissions settings, in some implementations an external party may utilize access device 160 to communicate with portal subsystem 150 and access and view the baseline data structure 200. While the external party may be allowed to view the baseline data structure 200, the structure 200 may be fixed, i.e., unchangeable by the external party. This enables system 100 to maintain data integrity between the global and local data.

To help facilitate an understanding of principles disclosed herein, the elements of baseline data structure 200 will now be described. As shown, baseline data structure 200 may include subscriber records 210 and subscription records 220. Map records 230 may also be included within the baseline data structure 200 and may define relationships between subscriber records 210 and subscription records 220. Subscriber records 210 and subscription records 220 may include any information related to an external party, including customer entity and account information. Hence, baseline data structure 200 may represent a base set of data relationships.

In the example shown in FIG. 2, baseline data structure 200 may include a subscriber record 210-1 having subscription records 220-1 and 220-2 as child nodes. Subscriber record 210-1 may be assigned a unique identifier, which may be used to identify subscriber record 210-1. Baseline data structure 200 may also include subscriber record 210-2 having subscription records 220-3 and 220-4 as child nodes. Subscription record 220-5 may also be included in baseline data structure 200 but not associated with a parent data record. Such may be the case where no parent node is associated with a subscription record in the local data. Baseline map records 230 may define the relationships between data records as shown in FIG. 2.

Baseline map records 230 may include a map record type identifier representing that the baseline map records 230 are associated with and define relationships for a baseline data structure 200. Baseline map records 230 may be configured to prevent external user modification of the baseline data structure 200.

Portal subsystem 150 may be configured to provide a customizable data structure associated with the baseline data structure 200 of FIG. 2. FIG. 3 illustrates an exemplary customizable data structure 300 associated with baseline data structure 200.

As shown, customizable data structure 300 may include copies of the subscriber records 210 (subscriber records 210-1 and 210-2) and subscription records 220 (subscription records 220-1 through 220-5) included in the baseline data structure 200. Upon creation, the copied data records may be automatically arranged to represent an initial set of data relationships that can be modified by a user to represent a custom set of data relationships. As shown in FIG. 3, customizable data structure 300 may include copied subscriber record 210-1 having a new subscriber record 210-3 as a child node. Subscriber record 210-3 may be created automatically as a default node (also referred to as "default folder") underneath which copies of the other data records in baseline data structure 200 may be placed. As shown, copied subscriber record 210-2 and subscription records 220-1, 220-2, and 220-5 may be child nodes of new subscriber record 210-3. Copied subscription records 220-3 and 220-4 remain child nodes of copied subscriber record 210-2.

The initial arrangement of the copied data records in customizable data structure 300 may be determined based on a predefined heuristic and the associated baseline data structure 200. As an example of a predefined heuristic that may be used to automatically generate an initial set of data relationships represented by customizable data structure 300, any data record, which in baseline data structure 200 is a direct child of subscriber record 210-1 (the head node) or does not have an assigned parent node, may be copied and positioned as a direct child node of new subscriber record 210-3 in customizable data structure 300. Data records having other parent nodes in baseline data structure 200 may maintain the same relationships with the parent nodes in customizable data structure 300. Of course, other predefined heuristics may be used in other implementations.

Map records used to link subscriber records 210 and subscription records 220 in customizable data structure 300 may include map record type identifiers representing a type of map record that allows for identification of the customizable data structure 300 as well as external modification of the data relationships represented in customizable data structure 300. Such map records may be referred to as "customizable map records" and are indicated with reference numbers 330 in FIG. 3.

Permissions settings may be updated so that the permissions group having permission to access and view baseline data structure 200 is also able to access, view, and modify customizable data structure 300. Accordingly, a user in the permission group may have access to both the baseline data structure 200 and the associated customizable data structure 300.

Portal subsystem 150 may provide one or more tools configured to enable a user to modify the customizable data structure 300 to represent custom data relationships as may suit particular purposes or preferences. Examples of tools that may be provided include, but are not limited to, tools for creating, deleting, moving, and otherwise modifying subscriber data records 210 and data relationships in the customizable data structure 300. The tools may also enable a user to move subscription records 220 within the customizable data structure 300, thereby allowing the user to modify data relationships for the subscription records 220. In certain implementations, users may be prevented from adding or deleting subscription records 220 in the customizable data structure 300 such that the enterprise maintaining the data is able to maintain ultimate control and data integrity for customer accounts. As a user modifies customizable data structure 300, subscriber records 210, subscription records 220, and map records 330 may be modified accordingly, including creating, modifying, and deleting map records 330 to represent custom data relationships.

FIG. 4 illustrates a custom data structure 400 that has been created by an external user modifying customizable data structure 300. As compared to the initial set of data relationships represented in customizable data structure 300 in FIG. 3, FIG. 4 shows that subscriber record 210-2 has been moved from being a child node of subscriber record 210-3 to become a child node of subscriber record 210-1, subscription records 220-3 and 220-4 have remained child nodes of subscriber record 210-2, a new subscriber record 210-4 has been created as a child node of subscriber record 210-1, and subscription record 220-2 has been moved from being a child node of subscriber record 210-3 to become a child node of new subscriber record 210-4. Accordingly, custom data structure 400 represents a custom set of data relationships.

External user access to multiple views of the custom data structure 400, or different sections of the custom data structure 400, may be provided. The views may be associated with different permissions and provide various users or user groups with access to different sections of the custom data structure 400. As an example, a user may be assigned a super administrator role giving the user access to and control over the custom data structure 400, including being able to modify the custom data structure 400 to represent a custom set of data relationships.

The super administrator may also be allowed to define permissions for other users. For example, another user may be assigned a sub-administrator permissions role and be given access to and control over only a particular subsection of the custom data structure 400. For instance, the sub-administrator may be given access to and control over subscriber record 210-4 and any data records underneath subscriber record 210-4 (subscription record 220-2 in FIG. 4).

As another example, the super administrator may assign another user with a viewing permissions role that allows the user to access and view only a particular subsection of the custom data structure 400. For instance, the user may be assigned permissions for accessing and viewing subscriber record 210-2 and any data records underneath subscriber record 210-2 (subscription records 220-3 and 220-4 in FIG. 4).

While permissions may be defined and assigned to support multiple different views of different sections of custom data structure 400, the views, although not directly dependent on one another, remain dependent on the custom data structure 400. For example, a sub-administrator may be able to view and modify a subsection of the custom data view 400, but the view is merely on top of the custom data structure 400 and any changes made to the to the custom data structure 400 by the super administrator and that affect the subsection will be included in the sub-administrator view. Thus, the sub-administrator view is dependent on the underlying custom data structure 400 and thus not customizable independently of the custom data structure 400.

However, alternative to or in addition to multiple views of the custom data structure 400, portal subsystem 150 may be configured to provide one or more other customizable data structures that are customizable independently of the custom data structure 400. As an example, an external party having permissions to access baseline data structure 200 and to access and modify customizable data structure 300 may modify customizable data structure 300 to form custom data structure 400, as described above. In addition, the external party may wish to create another custom data structure that can exist concurrently with and independently of custom data structure 400 and be used to represent a different custom set of data relationships.

Figure 5:
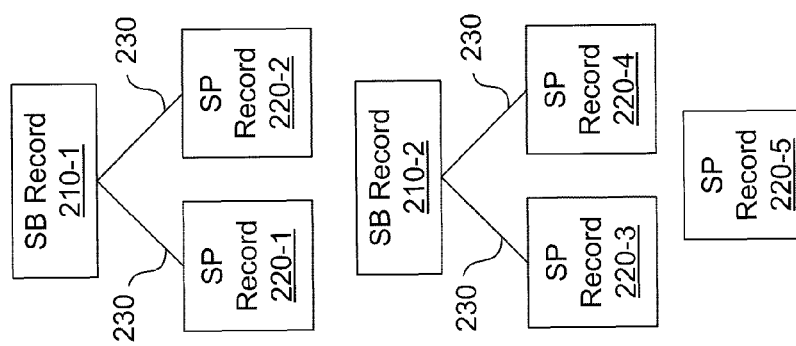
FIG. 5 illustrates an exemplary copy of the baseline data structure of FIG. 2.

Portal subsystem 150 may be configured to create and provide another customizable data structure that can be customized independently of customizable data structure 400. To this end, portal subsystem 150 may communicate with data store 140 to create a copy of baseline data structure 200. A copy of the baseline data structure 200 is shown in FIG. 5 and represented by reference number 500. The copied baseline data structure 500 may be stored in data store 140.

Portal subsystem 150 may be configured to provide (e.g., update) permissions settings configured to grant the user or user group having access to baseline data structure 200 with access to copied baseline data structure 500. This may include updating permissions settings in data store 140.

Portal subsystem 150 may be configured to link or otherwise associate baseline data structure 200 to its copy 500 such that updates to the baseline data structure 200 can be propagated through to the copied baseline data structure 500. This may help maintain data integrity and enforce permissions settings. Data representative of an association between baseline data structure 200 and its copy 500 may be stored in data store 140. In some implementations, data representative of the association may be part of baseline data structure 200. Accordingly, baseline data structure 200 may include data indicative of any existing copies of the baseline data structure 200.

Figure 6:
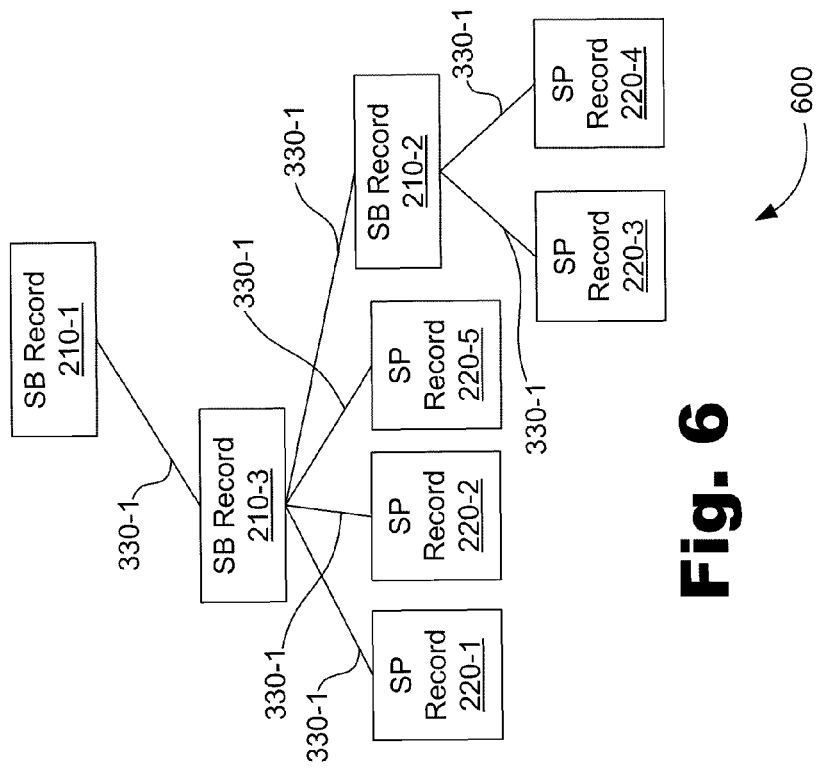
FIG. 6 illustrates an exemplary second customizable data structure associated with the copied baseline data structure of FIG. 5.

Copied baseline data structure 500 may be used to create and provide another customizable data structure. This may be performed similarly to how baseline data structure 200 is used to create and provide customizable data structure 300, as described above. For example, copies of the data records in baseline data structure 500 may be generated and initially arranged in accordance with a predefined heuristic and the copied baseline data structure 500 to form another customizable data structure 600 shown in FIG. 6. As shown in FIG. 6, customizable data structure 600 may include copied subscriber record 210-1 having a new subscriber record 210-3 as a child node. Subscriber record 210-3 may be created automatically as a default node (also referred to as "default folder") underneath which copies of the data records in baseline data structure 500 may be placed. As shown, copied subscriber record 210-2 and subscription records 220-1, 220-2, and 220-5 may be child nodes of new subscriber record 210-3. Copied subscription records 220-3 and 220-4 may remain child nodes of copied subscriber record 210-2.

New custom map records represented as reference numbers 330-1 may be generated and used to define relationships between data records in customizable data structure 600. The custom map records 330-1 may include a unique attribute (e.g., an identifier) representing that the custom map records 330-1 are associated with customizable data structure 600. The use of uniquely identifiable custom map records 330 or 330-1 for each distinct customizable data structure 200 or 600, respectively, can be used to identify and facilitate the independence of customizable data structures 200 and 600, and thereby support concurrent representation of different data relationships by the customizable data structures 200 and 600.

Portal subsystem 150 may update permissions settings such that the permissions group having permission to access and view baseline data structure 500 is also able to access, view, and modify customizable data structure 600.

Figure 7:
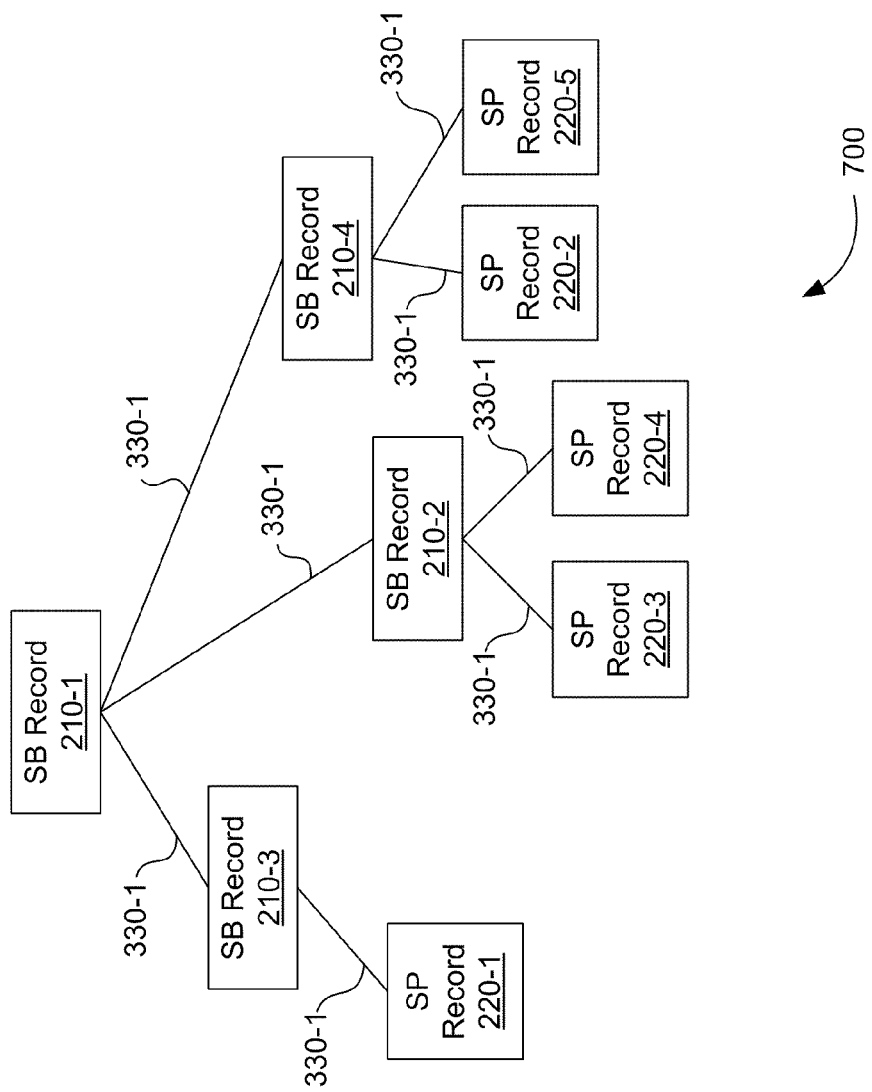
FIG. 7 illustrates the exemplary second customizable data structure of FIG. 6 as modified to represent a second custom set of data relationships.

Similar to the customization of customizable data structure 300 to form custom data structure 400 described above, customizable data structure 600 may be modified to represent another custom set of data relationships. FIG. 7 illustrates another custom data structure 700, which may be created by an external user providing user input and portal subsystem 150 modifying the customizable data structure 600 based on the user input. Any of the tools described above may be used to customize the custom data structure 700.

Custom data structure 700 may represent a second custom set of data relationships that is distinct from and independent of the first custom set of data relationships represented by custom data structure 400. As compared to the data relationships represented by custom data structure 400 shown in FIG. 4, for example, FIG. 7 shows that subscription record 220-5 has been moved from being a child node of subscriber record 210-3 in custom data structure 400 to become a child node of subscriber record 210-4 in custom data structure 700. This is merely one example of first and second custom data structures 400 and 700 representing different and independent custom sets of data relationships.

Figure 8:
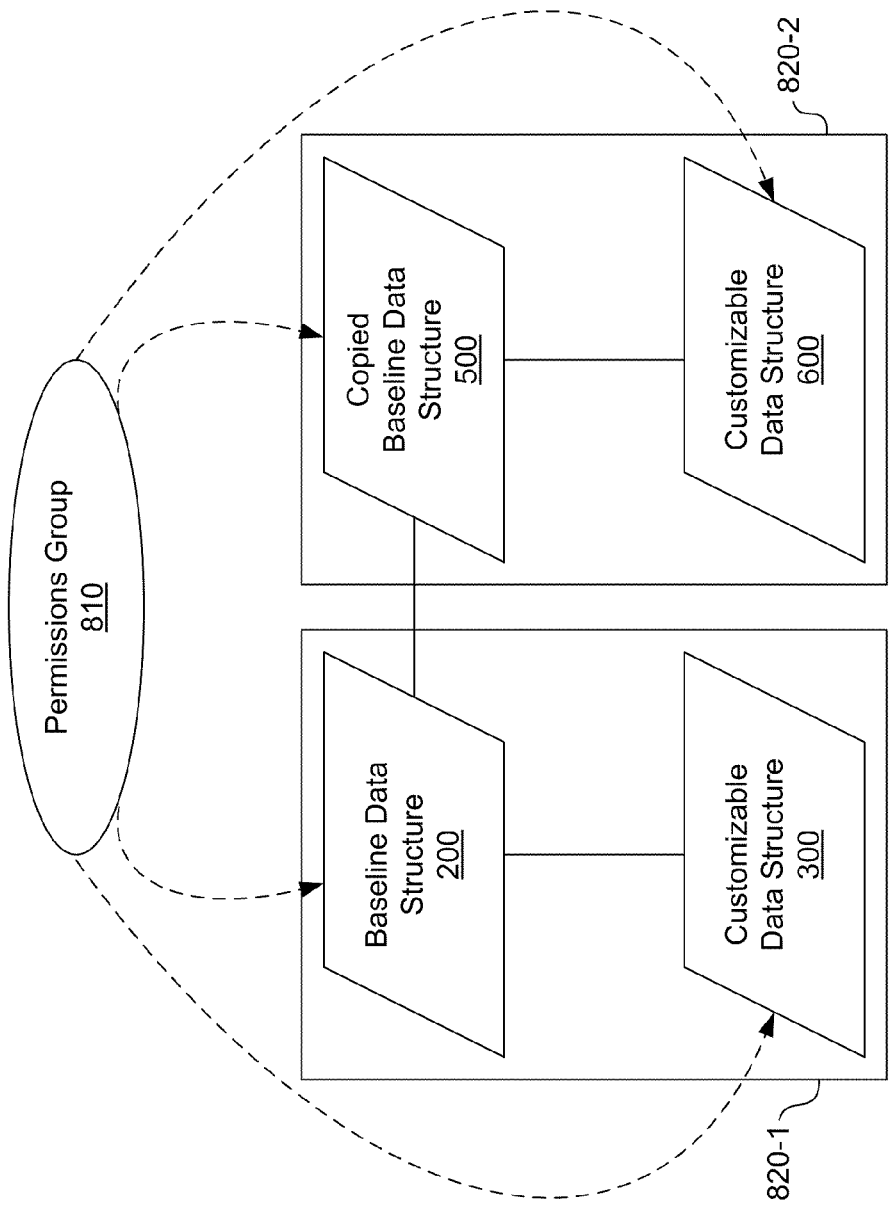
FIG. 8 illustrates exemplary associations between a permissions group and the baseline data structures and customizable data structures of FIGS. 2, 3, 5, and 6.

Based on the above description, a user or group of users included in a permissions group as defined by permissions settings may be provided with one or more tools for externally creating, accessing, and modifying multiple customizable data structures 300 and 600 that may be modified to concurrently and independently represent different custom sets of data relationships. FIG. 8 illustrates a permissions group 810 having access to baseline data structure 200 and customizable data structure 300, and to baseline data structure 500 and customizable data structure 600. Accordingly, permissions group 810 may be provided with access to multiple independently customizable data structures 300 and 600 in accordance with permissions settings that may be defined internally, e.g., by an internal party operating data integration subsystem 120 and local data subsystems 110.

The providing of multiple independent customizable data structures 300 and 600 may be referred to as custom data structure versioning. Customizable data structure 300 may be customized to represent a first custom version of data relationships, and customizable data structure 600 may be independently customized to represent a second custom version of data relationships. An association of each of the customizable data structures 300 and 600 with an associated baseline data structure 200 and 500, respectively, facilitates the independence of the customizable data structures 300 and 600. Together, a baseline data structure and its associated customizable data structure may be referred to as a "data structure versioning unit" or simply a "versioning unit." In FIG. 8, baseline data structure 200 and its associated customizable data structure 300 may be referred to as versioning unit 820-1, and baseline data structure 500 and its associated customizable data structure 600 may be referred to as versioning unit 820-2.

Data updates may be propagated across baseline data structures 200 and 500 and through to customizable data structures 300 and 600. In some implementations, this may include synchronizing copied baseline data structure 500 with the original baseline data structure 200 and updating customizable data structures 300 and 600 based on changes made to the associated baseline data structures 200 and 500, respectively.

Figure 9:
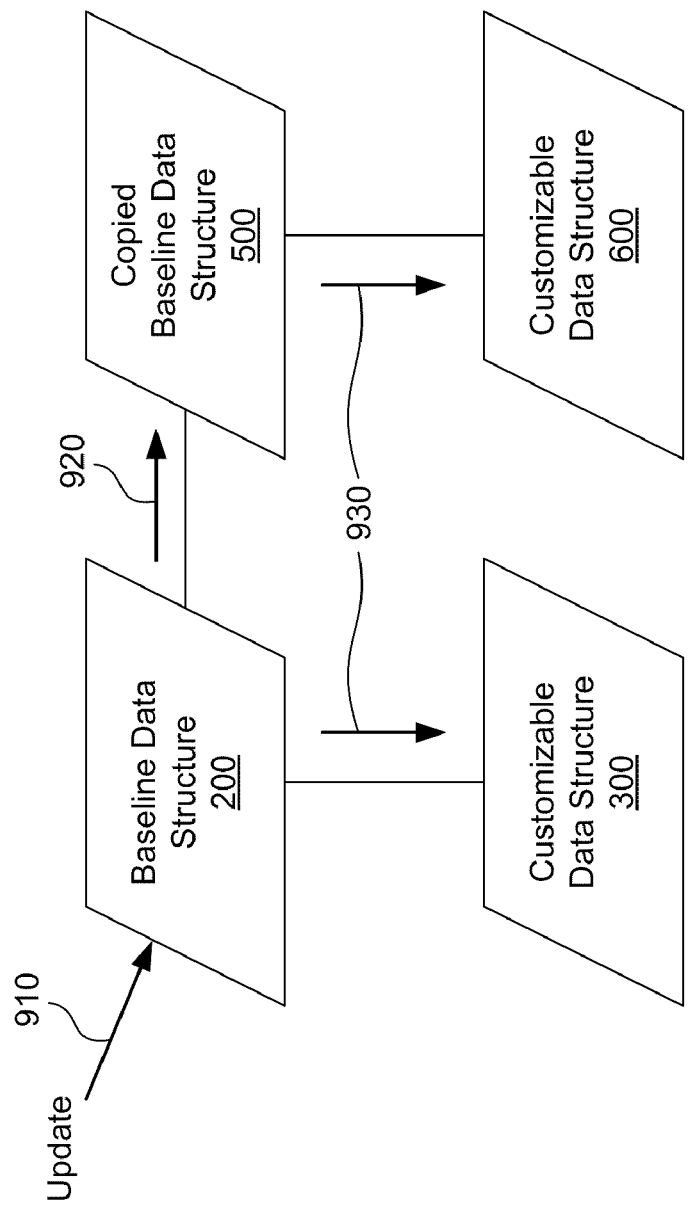
FIG. 9 illustrates an exemplary updating of the baseline data structures and customizable data structures of FIGS. 2, 3, 5, and 6.

FIG. 9 illustrates as exemplary data update flow. In FIG. 9, a data update may be made to baseline data structure 200, as represented by reference number 910. The data update may be received from any suitable source. For example, local data may be updated and the global data synchronized to reflect the local update, which synchronization may include modifying the baseline data structure 200. As another example, permissions settings associated with the baseline data structure 200 may be modified and baseline data structure 200 modified accordingly in order to enforce the current permissions settings.

The update to baseline data structure 200 may be propagated through to the copied baseline data structure 500, as represented by reference number 920 in FIG. 9. As mentioned above, the global data may include data representative of an association between baseline data structure 200 and copied baseline data structure 500. The data representative of the association may be used to determine that the update should be propagated through to the copied baseline data structure 500.

Portal subsystem 150 may be configured to compare the contents of baseline data structure 200 and the associated customizable data structure 300 to identify any differences. A comparison may be performed periodically (e.g., nightly during off-peak hours) or in response to a detection of update 910 to the baseline data structure. If the comparison detects any differences, portal subsystem 150 may update the customizable data structure 300 based on the differences, which update is represented by reference number 930 in FIG. 9.

An update of customizable data structure 300 may include synchronizing the customizable data structure 300 to the baseline data structure 200 (i.e., automatically propagating change 910 through to customizable data structure 300) and/or inserting notification of update 910 or 930 in the customizable data structure 300. The notification may be useful to a user accessing the customizable data structure 300. In some implementations and/or for certain types of updates, the user may be provided an option for selecting whether to accept or reject the update in customizable data structure 300. Customizable data structure 600 may be updated in similar fashion based on any updates made to its associated copied baseline data structure 500.

Synchronization of customizable data structure 300 with baseline data structure 200 may support enforcement of permissions settings. For example, if baseline data structure 200 is modified such that data is removed as no longer being accessible to a user, the same data in customizable data structure 200 may be removed to ensure that the user no longer has access to the data. Synchronization can also help ensure that the data in customizable data structure 300 is current.

The above description is directed to an example of "horizontal" data structure versioning in which a full copy 500 of baseline data structure 200 is made and used to support a customizable data structure 600. Horizontal data structure versioning may refer to the use of full copies of baseline data structures to support multiple independent and customizable data structures. Inasmuch as permissions settings may be associated with a baseline data structure 200 (e.g., with the parent node 210-1 of the baseline data structure 200), a full copy of baseline data structure 200 generally has the same permissions settings as the original baseline data structure 200. Accordingly, horizontal data structure versioning may be used to provide a permissions group (e.g., a particular user or group of users) with access to multiple independent and customizable data structures 300 and 600 based on at least one full copy 500 of baseline data structure 200, as described above.

Figure 10:
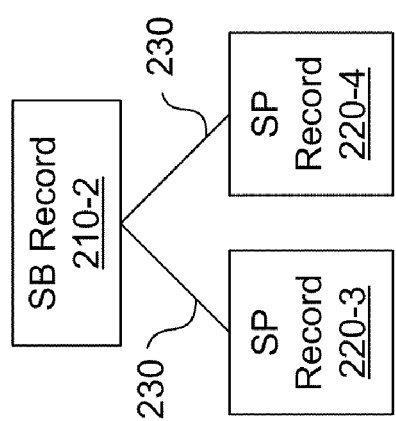
FIG. 10 illustrates an exemplary copy of a subset of the baseline data structure of FIG. 2.

The principles described above may alternatively or additionally be used for "vertical" data structure versioning in which a subset copy of baseline data structure 200 is made and used to support a customizable data structure. Vertical data structure versioning may be used to provide independently customizable data structures to different permissions groups (e.g., different users having different permissions) and for different sections of data structures. For example, FIG. 10 illustrates a subset copy 1000 of baseline data structure 200. As shown, the subset copy 1000 may include a copy of a portion of baseline data structure 200, the copied portion including a copy of subscriber record 210-2 as the parent node the subset copy 1000 and copies of subscription records 220-3 and 220-4 as child nodes of copied subscriber record 210-2.

Figure 11:
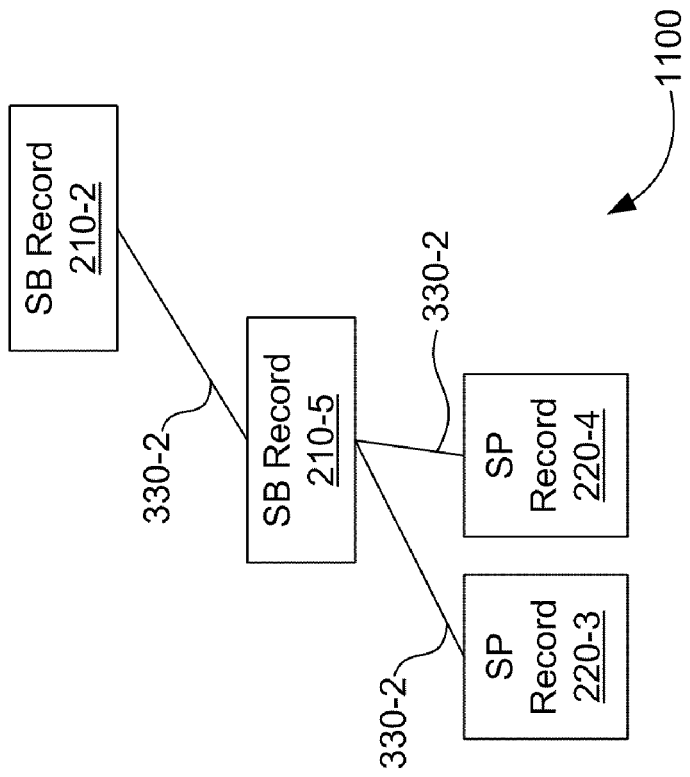
FIG. 11 illustrates an exemplary third customizable data structure associated with the subset copied baseline data structure of FIG. 10.

According to principles described above, a customizable data structure may be created and associated with the subset copy 1000. FIG. 11 illustrates an exemplary customizable data structure 1100 that is associated with the subset copy 1000. As with customizable data structure 600, customizable data structure 1100 may define an initial set of data relationships based on a predefined heuristic and the associated subset copy 1000 of the baseline data structure 200. In the illustrated example, a new subscriber record 220-5 has been created as a child node of copied subscriber node 210-2, and copies of subscription records 220-3 and 220-4 have been made child nodes of the new subscriber record 220-5 to form customizable data structure 1100. New custom map records represented as reference numbers 330-2 may be generated and used to define relationships between data records in customizable data structure 1100. The custom map records 330-2 may include a unique attribute (e.g., an identifier) representing that the custom map records 330-2 are associated with customizable data structure 1100.

Figure 12:
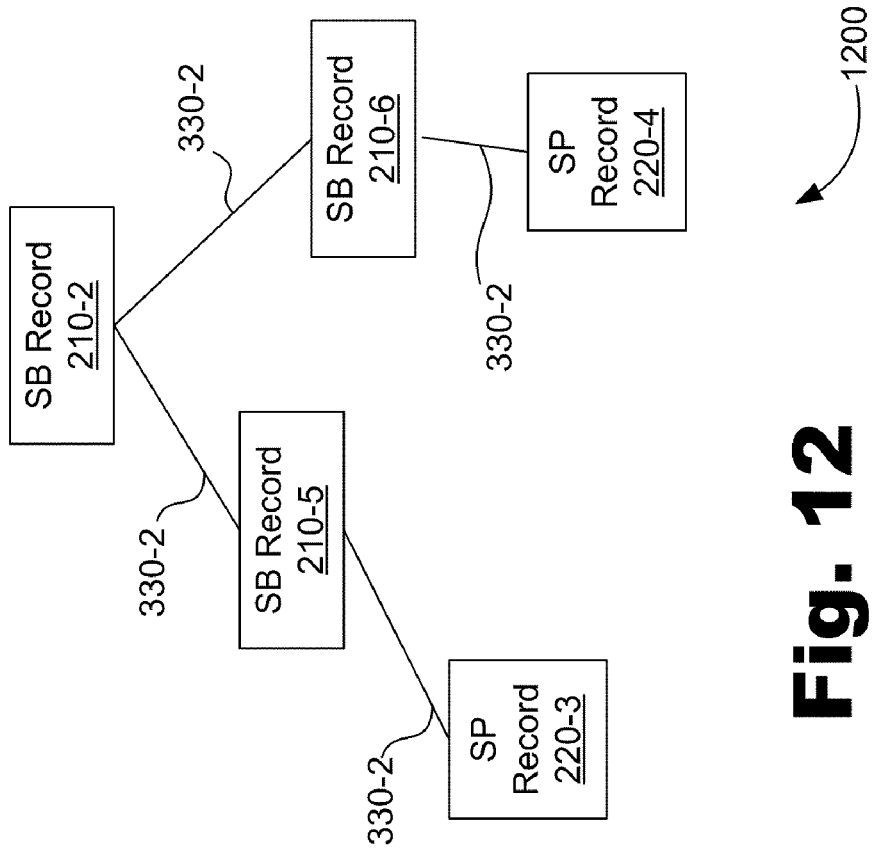
FIG. 12 illustrates the exemplary third customizable data structure of FIG. 11 as modified to represent a third custom set of data relationships.

According to principles described above, customizable data structure 1100 may be customized based on external user input to define a custom set of data relationships. FIG. 12 illustrates a custom data structure 1200 that has been created by a user modifying customizable data structure 1100 to define a custom set of data relationships. As compared to customizable data structure 1100, custom data structure 1200 includes a new subscriber record 210-6 positioned as a child node of subscriber record 210-2, and subscription record 220-4 has been moved from being a child node of subscriber record 220-5 to become a child node of subscriber record 210-6. Custom data structure 1200 illustrates yet another example of a custom data structure independently representing another custom set of data relationships.

Figure 13:
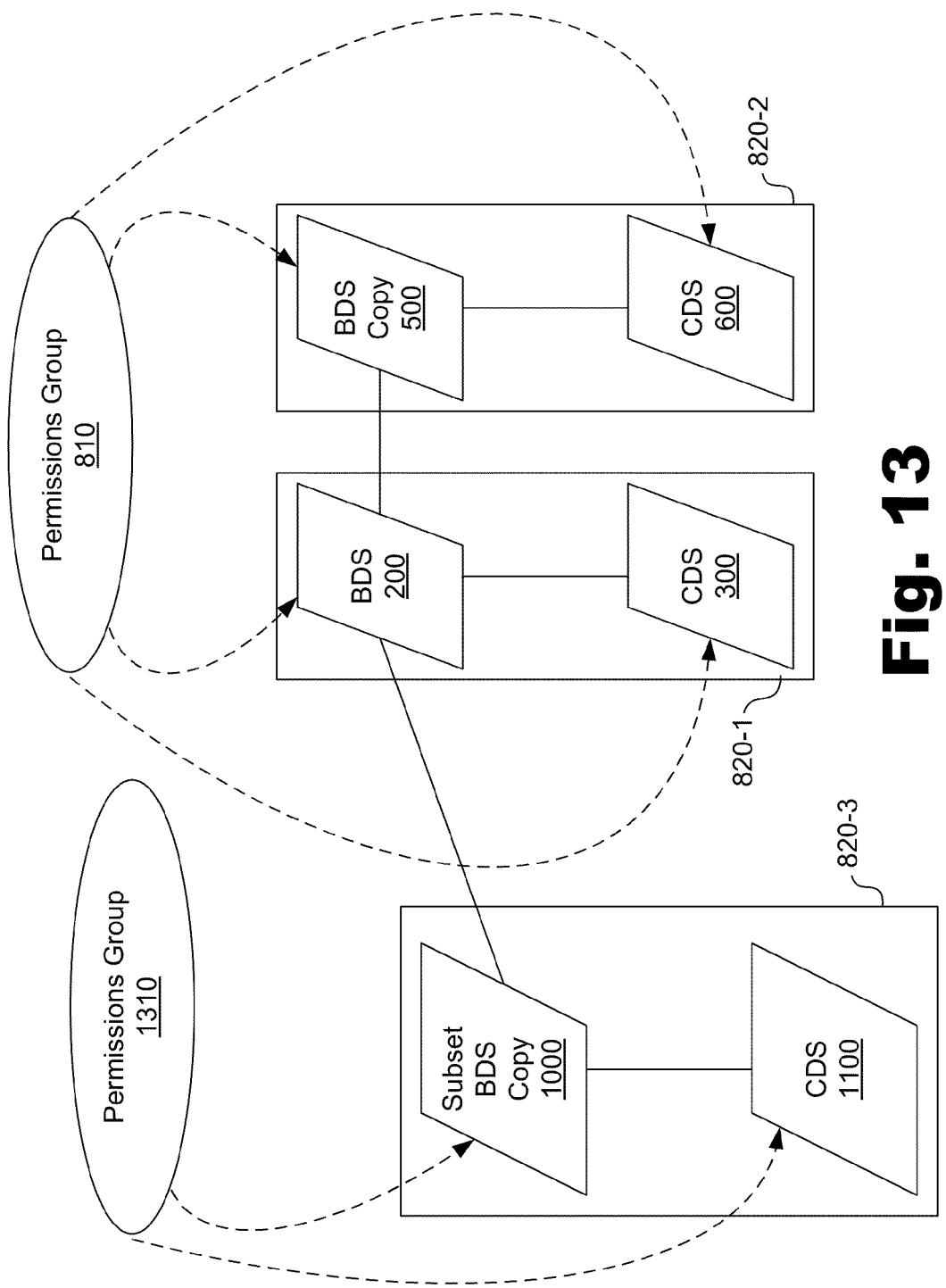
FIG. 13 illustrates exemplary associations between permissions group and the baseline data structures and customizable data structures of FIGS. 2, 3, 5, 6, 10 and 11.

FIG. 13 illustrates an exemplary configuration including both horizontal and vertical data structure versioning and associated permissions group relationships. As shown, permissions group 810 may have access to baseline data structure 200 and customizable data structure 300 (collectively "versioning unit 820-1"), baseline data structure 500 and customizable data structure 600 (collectively "versioning unit 820-2"), and subset copied baseline data structure 1000 and customizable data structure 1100 (collectively "versioning unit 820-3"). Permissions group 1310 may have access only to subset copied baseline data structure 1000 and the associated customizable data structure 1100. In this or similar manner, vertical data structure versioning may be used to provide users having different permissions settings with access to independently customizable data structures 300, 600, and 1100, which can be modified to represent independent, custom sets of data relationships such as those represented by custom data structures 400, 700, and 1200. Updates of custom data structure 1200 may be performed in the same or similar manner as described above in relation to custom data structures 400 and 700.

Figure 14:
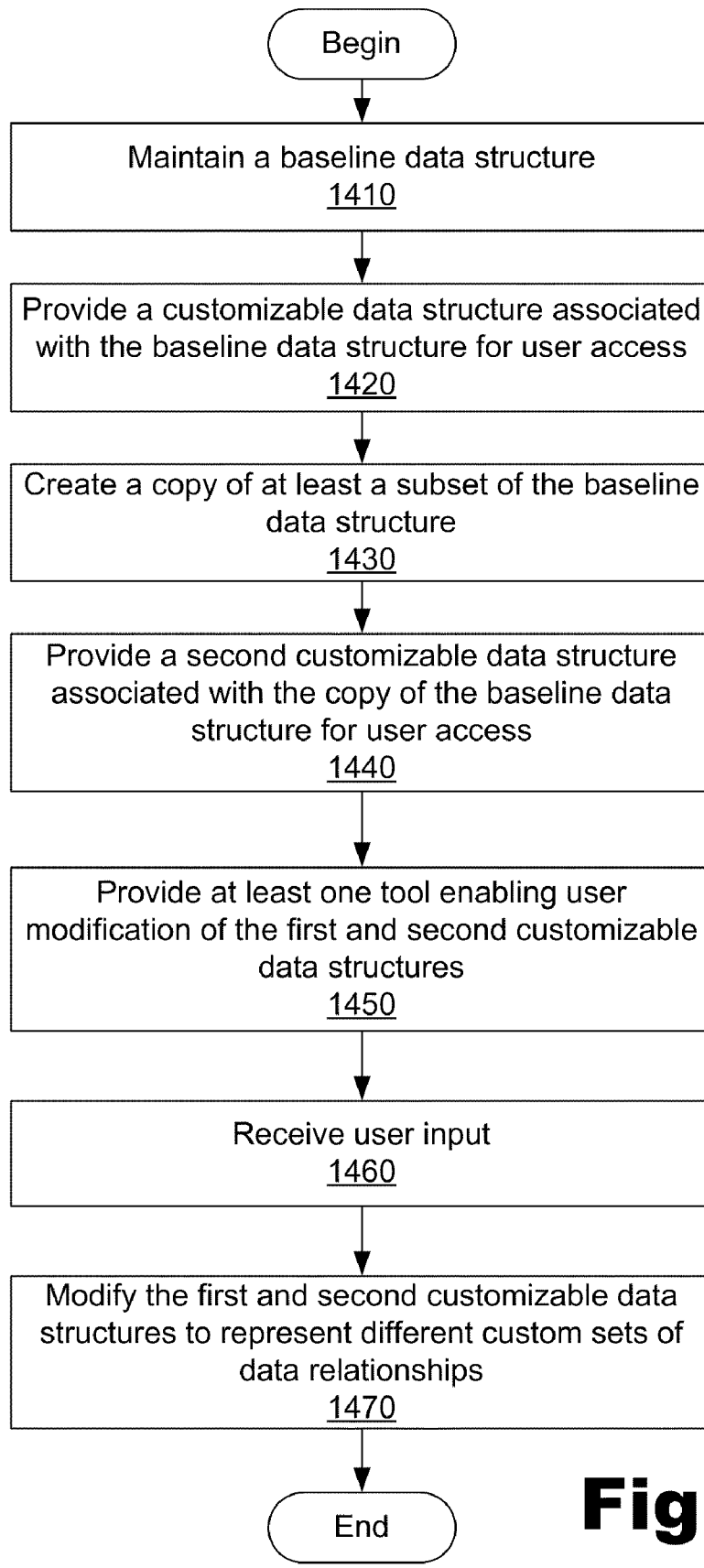
FIG. 14 illustrates an exemplary data structure versioning process.

FIG. 14 is a flowchart illustrating an exemplary data structure versioning process. While FIG. 14 illustrates exemplary steps according to one implementation, other implementations may omit, add to, reorder, and/or modify any of the steps shown in FIG. 14.

In step 1410, a baseline data structure is maintained. Step 1410 may be performed in any of the ways described above, including data integration subsystem 120 maintaining the baseline data structure and a mapping of the baseline data structure to local data maintained by local data subsystems 110. As mentioned, the baseline data structure may represent a base set of data relationships, such as one or more relationships between subscriber and subscription data records associated with an external party, for example.

In step 1420, a first customizable data structure associated with the baseline data structure is provided for user access. Step 1420 may be performed in any of the ways described above and may include portal subsystem 150 creating the first customizable data structure to represent an initial set of data relationships based on a predefined heuristic and the baseline data structure. As described above, the portal subsystem 150 may provide the first customizable data structure for access by an external party (i.e., external user access) based on permission settings.

In step 1430, a copy of at least a subset of the baseline data structure is created. Step 1430 may be performed in any of the ways described above, including the portal subsystem 150 creating and storing the copy in data store 140. As described above, the portal subsystem 150 may also define an association between the baseline data structure and the copy of the baseline data structure, which association may be used for propagating changes made to the baseline data structure through to the copy of the baseline data structure. As described above, the copy may be a full copy for horizontal data structure versioning or a subset copy for vertical data structure versioning.

In step 1440, a second customizable data structure associated with the copied baseline data structure is provided for user access. Step 1440 may be performed in any of the ways described above and may include portal subsystem 150 creating the second customizable data structure to represent another initial set of data relationships based on the predefined heuristic and the copy of the baseline data structure. As described above, the portal subsystem 150 may provide the second customizable data structure for access by the external party (i.e., external user access) based on permission settings.

In step 1450, at least one tool enabling user modification of the first and second customizable data structures is provided. Step 1450 may be performed in any of the ways described above, including portal subsystem 150 providing the tool(s) to an external party having permission to access and modify the first and second customizable data structures.

In step 1460, user input is received. Step 1460 may be performed in any of the ways described above, including portal subsystem 150 receiving signals representative of external user input from access device 160.

In step 1470, the first and second customizable data structures are modified to represent different custom sets of data relationships. The different custom sets of data relationships may include first and second custom sets of data relationships, which may be provided concurrently and independently of one another. Step 1470 may be performed in any of the ways described above.

The above-described exemplary systems and methods may provide an external party, such as a customer of an enterprise, with capabilities for defining concurrent and independent versions of custom data relationships. Accordingly, the external party can flexibly manage associated data maintained by an internal party, including defining concurrent and independent versions of custom data relationships as may suit various business purposes, organizations, personnel, and/or operations associated with the external party. As an example, various business departments such as sales, billing, etc. can define and use independent and concurrent custom sets of data relationships.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
    maintaining a baseline data structure comprising a plurality of baseline data records and a base set of relationships between the baseline data records;
    providing, for access by an external party, a customizable data structure comprising copies of the baseline data records and a customizable set of relationships between the copies of the baseline data records;
    fixing the base set of relationships in the baseline data structure to be unchangeable by the external party; and
    defining the customizable set of relationships in the customizable data structure to be changeable by the external party;
    wherein:
    the baseline data structure comprises one or more fixed-type map records that represent the base set of data relationships between the baseline data records included in the baseline data structure, the fixed-type map records indicating that the base set of data relationships between the baseline data records included in the baseline data structure are unchangeable by the external party; and
    the customizable data structure comprises one or more customizable-type map records that represent the customizable set of data relationships between the copies of the baseline data records included in the customizable data structure, the customizable-type map records indicating that the customizable set of data relationships between the copies of the baseline data records included in the customizable data structure are changeable by the external party.

2. The method of claim 1, further comprising creating the customizable data structure by creating the copies of the baseline data records and defining the customizable set of data relationships between the copies of the baseline data records based on a predefined heuristic and on the baseline data structure.

3. The method of claim 1, further comprising:
    receiving user input provided by the external party; and modifying the customizable set of data relationships based on the user input to represent a custom set of data relationships.

4. The method of claim 1, further comprising:
detecting at least one difference between the baseline data structure and the customizable data structure; and
updating the customizable data structure based on the at least one detected difference.

5. The method of claim 4, wherein the updating includes at least one of:
synchronizing the customizable data structure with the baseline data structure; and
inserting a notification of the at least one detected difference in the customizable data structure.

6. The method of claim 1, further comprising propagating an update made to the baseline data structure from the baseline data structure to the customizable data structure.

7. The method of claim 1, further comprising providing different users associated with the external party with access to different sections of the customizable data structure based on permission settings.

8. The method of claim 1, tangibly embodied as computer-executable instructions on at least one non-transitory computer-readable medium.

9. A method comprising:
maintaining a baseline data structure comprising a plurality of baseline data records and a base set of relationships between the baseline data records;
providing, for access by an external party, a customizable data structure comprising copies of the baseline data records and a customizable set of relationships between the copies of the baseline data records;
fixing the base set of relationships in the baseline data structure to be unchangeable by the external party;
defining the customizable set of relationships in the customizable data structure to be changeable by the external party;
creating a copy of the baseline data structure, the copy comprising copies of the baseline data records and the base set of data relationships between the baseline data records;
providing, for access by the external party, a second customizable data structure comprising copies of the baseline data records included in the copy of the baseline data structure and a second customizable set of relationships between the copies of baseline data records included in the copy of the baseline data structure;
fixing the base set of relationships in the copy of the baseline data structure to be unchangeable by the external party; and
defining the second customizable set of relationships in the second customizable data structure to be changeable by the external party.

10. The method of claim 9, wherein the customizable set of data relationships and the second customizable set of data relationships are independently customizable by the external party to represent different custom sets of data relationships.

11. The method of claim 9, wherein the baseline data structure comprises data indicative of the copy of the baseline data structure.

12. The method of claim 9, further comprising propagating a change made to the baseline data structure from the baseline data structure to the copy of the baseline data structure.

13. The method of claim 9, further comprising creating the customizable data structure by creating the copies of the baseline data records and defining the customizable set of data relationships between the copies of the baseline data records based on a predefined heuristic and on the baseline data structure.

14. The method of claim 9, further comprising:
receiving user input provided by the external party; and
modifying the customizable set of data relationships based on the user input to represent a custom set of data relationships.

15. The method of claim 9, further comprising:
detecting at least one difference between the baseline data structure and the customizable data structure; and
updating the customizable data structure based on the at least one detected difference.

16. The method of claim 15, wherein the updating includes at least one of:
synchronizing the customizable data structure with the baseline data structure; and
inserting a notification of the at least one detected difference in the customizable data structure.

17. The method of claim 9, further comprising propagating an update made to the baseline data structure from the baseline data structure to the customizable data structure.

18. The method of claim 9, further comprising providing different users associated with the external party with access to different sections of the customizable data structure based on permission settings.

19. A system comprising:
instructions stored in at least one non-transitory computer-readable medium; and
at least one processor configured to execute the instructions to
maintain a baseline data structure comprising a plurality of baseline data records and a base set of relationships between the baseline data records,
provide, for access by an external party, a customizable data structure comprising copies of the baseline data records and a customizable set of relationships between the copies of the baseline data records,
fix the base set of relationships in the baseline data structure to be unchangeable by the external party, and
define the customizable set of relationships in the customizable data structure to be changeable by the external party;
wherein:
the baseline data structure comprises one or more fixed-type map records that represent the base set of data relationships between the baseline data records included in the baseline data structure, the fixed-type map records indicating that the base set of data relationships between the baseline data records included in the baseline data structure are unchangeable by the external party; and
the customizable data structure comprises one or more customizable-type map records that represent the customizable set of data relationships between the copies of the baseline data records included in the customizable data structure, the customizable-type map records indicating that the customizable set of data relationships between the copies of the baseline data records included in the customizable data structure are changeable by the external party.

20. A system comprising:
instructions stored in at least one non-transitory computer-readable medium; and
at least one processor configured to execute the instructions to maintain a baseline data structure comprising a plurality of baseline data records and a base set of relationships between the baseline data records, provide, for access by an external party, a customizable data structure comprising copies of the baseline data records and a customizable set of relationships between the copies of the baseline data records, fix the base set of relationships in the baseline data structure to be unchangeable by the external party, define the customizable set of relationships in the customizable data structure to be changeable by the external party, create a copy of the baseline data structure, the copy comprising copies of the baseline data records and the base set of data relationships between the baseline data records, provide, for access by the external party, a second customizable data structure comprising copies of the baseline data records included in the copy of the baseline data structure and a second customizable set of relationships between the copies of baseline data records included in the copy of the baseline data structure, fix the base set of relationships in the copy of the baseline data structure to be unchangeable by the external party, and define the second customizable set of relationships in the second customizable data structure to be changeable by the external party.

21. The system of claim 20, wherein the customizable set of data relationships and the second customizable set of data relationships are independently customizable by the external party to represent different custom sets of data relationships.

* * * * *